(12) United States Patent
Shan et al.

(10) Patent No.: US 12,379,860 B2
(45) Date of Patent: *Aug. 5, 2025

(54) FIRMWARE POWER UP SEQUENCING IN MEMORY SUB-SYSTEMS

(71) Applicant: Micron Technology, Inc., Boise, ID (US)

(72) Inventors: Ximin Shan, San Jose, CA (US); Venkata Naga Lakshman Pasala, Milpitas, CA (US); Noorshaheen Mavungal Noorudheen, Trichur Kerala (IN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,186

(22) Filed: Apr. 4, 2024

(65) Prior Publication Data

US 2024/0248623 A1 Jul. 25, 2024

Related U.S. Application Data

(63) Continuation of application No. 17/877,406, filed on Jul. 29, 2022, now Pat. No. 11,977,755.

(30) Foreign Application Priority Data

Sep. 2, 2021 (IN) .............................. 202141039774

(51) Int. Cl.
*G06F 3/06* (2006.01)

(52) U.S. Cl.
CPC .......... *G06F 3/0632* (2013.01); *G06F 3/0611* (2013.01); *G06F 3/0673* (2013.01)

(58) Field of Classification Search
CPC .... G06F 3/0632; G06F 3/0611; G06F 3/0673; G06F 3/061; G06F 3/0634; G06F 3/0679
See application file for complete search history.

(56) References Cited

U.S. PATENT DOCUMENTS

| | | | | |
|---|---|---|---|---|
| 9,983,795 | B1 * | 5/2018 | Naamad | G06F 3/0629 |
| 2007/0055838 | A1 * | 3/2007 | Mitsuoka | G06F 3/0632 711/164 |
| 2019/0294351 | A1 * | 9/2019 | Ahmed Sheriff | G06F 3/0635 |

FOREIGN PATENT DOCUMENTS

WO WO-2021076179 A1 * 4/2021 ......... G06F 13/1668

* cited by examiner

*Primary Examiner* — Masud K Khan
(74) *Attorney, Agent, or Firm* — Lowenstein Sandler LLP

(57) ABSTRACT

A front-end firmware component of a memory sub-system receives a first request to perform a first set of initialization operations and initiates a first set of initialization operations for the front-end component in parallel with initiating a second set of initialization operations for a back-end component. Responsive to completing the first set of initialization operations, the front-end component sends a first notification to a host computer system to indicate that the front-end component is available to respond to requests for configuration data associated with the memory sub-system, receives a second request from the host computer system for a configuration data associated with the memory sub-system, and responsive to receiving the second request from the host computer system before the back-end component has completed the second set of initialization operations, provides the configuration data to the host computer system.

20 Claims, 5 Drawing Sheets

FIRMWARE POWER UP SEQUENCING IN MEMORY SUB-SYSTEMS

RELATED APPLICATION

This application is a continuation of U.S. patent application Ser. No. 17/877,406, filed Jul. 29, 2022, which claims the benefit under 35 U.S.C. § 119 to Indian Provisional Patent Application No. 202141039774, filed on Sep. 2, 2021, each of which are hereby incorporated by reference herein.

TECHNICAL FIELD

Embodiments of the disclosure relate generally to memory sub-systems, and more specifically, relate to firmware power up sequencing in memory sub-systems

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
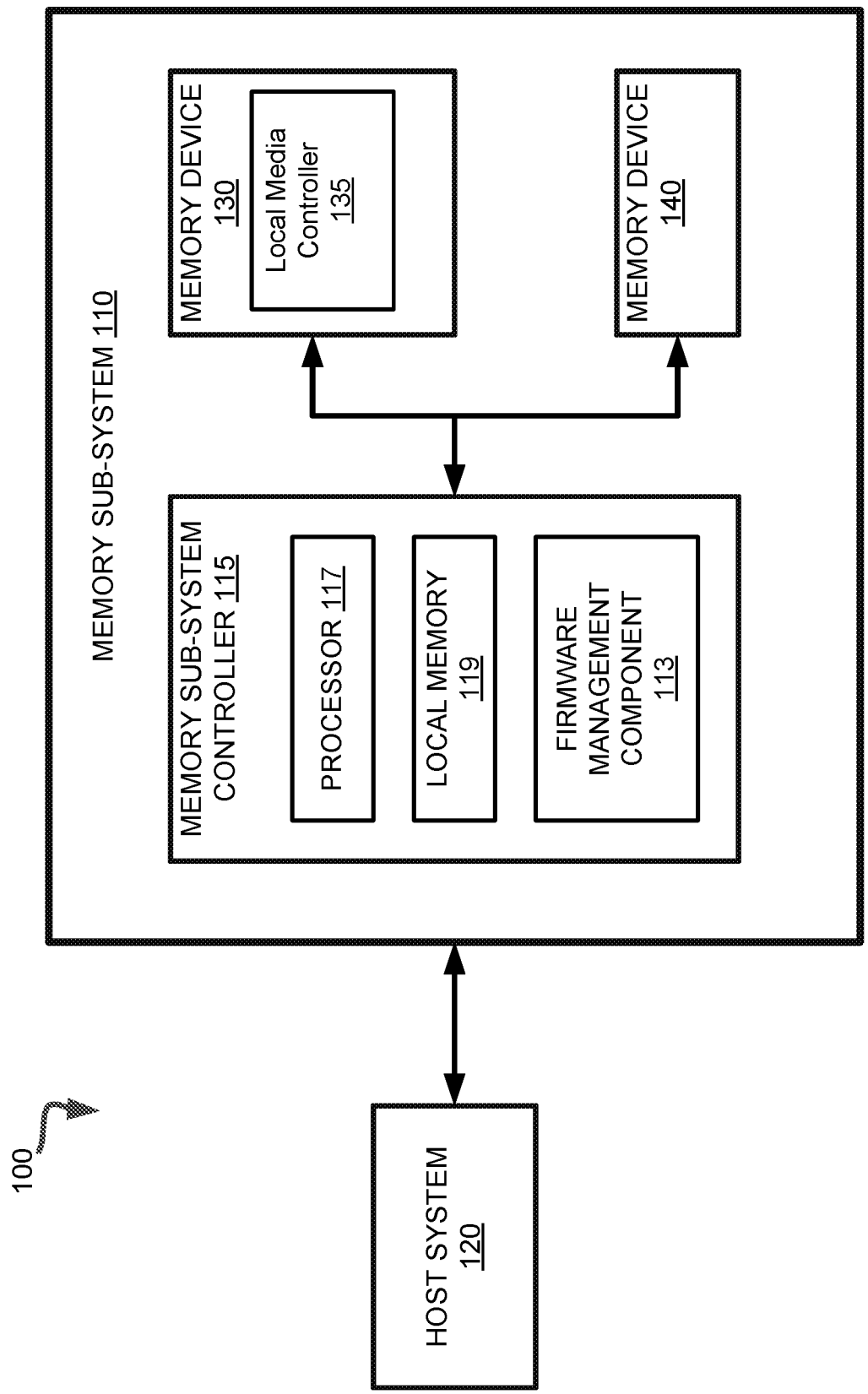
FIG. 1 illustrates an example computing system that includes a memory sub-system in accordance with some embodiments of the present disclosure.

Aspects of the present disclosure are directed to firmware power up sequencing in memory sub-systems. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored.

A non-volatile memory device can implement a cross point memory architecture. One example of cross point memory architecture is three-dimensional cross point (3D cross-point) memory architecture. A 3D cross-point memory architecture can be byte-addressable (e.g., similar to dynamic random-access memory (DRAM)). A 3D cross-point memory array can include a stackable cross point architecture in which the cells are located at the intersections of row address lines (wordlines or WLs) and column address lines (bitlines or BLs) arranged in a grid. More specifically, WLs and BLs cross in the formation of the grid, and each 3D cross-point memory cell ("3D cross-point cell") can be coupled between a WL and a BL at a cross point. At the cross point, the WL and BL can be positioned at different vertical planes such that the WL crosses over the BL without physical contact. The 3D cross-point architecture is stackable to improve storage density, such that a WL can cross over a first BL located beneath the WL and a second BL located above the WL.

A memory sub-system controller can perform access operations on a memory device such as read operations, programming operations, erase operations, or the like. The memory sub-system controller can include a firmware data path that facilitates handling requests from a host computing system and performing the access operations on a memory device. The firmware data path can include a front-end component that manages communication with a host computing system and a back-end component that manages the file system and access operations performed on the memory device. The firmware data path can also include a security component between the front-end component and back-end component that manages security access to the memory device (e.g., authentication, encryption, decryption, etc.).

In conventional memory sub-systems, the components in the firmware data path are initiated when the memory sub-system is powered up to perform various initialization operations. For example, the front-end component can perform operations to establish communications with the host, as well as perform operations to initialize memory areas used in conjunction with managing requests received from the host as well as responses provide to the host. The security component can perform operations to establish encryption/decryption key agreement with the back end as well as other security related start-up operations. The back-end can perform operations to initialize the file system and perform memory rebuild operations for the memory devices. In conventional systems, the start-up synchronization of these components are often performed one after the other, such that the security component initialization does not begin until the back-end initialization has completed, and the front-end initialization cannot complete until both the security component initialization and the back-end initialization have both completed.

These types of conventional start-up configurations often result in longer overall power-up times for the memory sub-system. In particular, the front-end waits until the back-end has completed its initialization to reply to any requests from the host, even if those requests do not involve performing input/output (I/O) operations. For example, the front-end often does not accept a request from the host for configuration information associated with the memory sub-system (such as information associated with the type of memory sub-system controller) until the back-end is fully operational. Conventional systems with larger number of memory devices can involve a much longer back-end initialization, which can result in extended power-up delays.

Conventional memory sub-systems attempt to mitigate these issues by attempting to reduce the amount of time needed for the back-end to initialize. These types of solutions, while able to decrease back-end power-up times to a degree, still involve the front-end waiting for the back-end to be ready. As such, there are often still delays in handling host requests that are not associated with I/O operations, which can violate service level agreements as well as industry availability standards.

Aspects of the present disclosure address the above and other deficiencies by improving synchronization of the various firmware components during system power-up to reduce the overall start-up initialization time for the firmware data path, as well as significantly reduce the delays in handling non-I/O requests from the host by the front-end. In one embodiment, a firmware management component of the memory sub-system controller can initiate the initialization operations for the front-end, security component, and back-end in parallel to improve the overall start-up time. The front-end, upon completing its initialization can notify the host that it is able to respond to non-I/O related requests (e.g., requests for configuration information that do not involve interfacing with the memory devices). The security component, upon completing its initialization, can begin sending file system requests as well as encryption/decryption requests to the back-end without waiting for the back-end to complete its initialization. The back-end can establish, prior to beginning initialization, a request queuing mechanism to receive requests and hold them until initialization is complete. Once complete, the back-end can begin servicing requests in queue.

Advantages of the present disclosure include, but are not limited to, significantly reduced overall start-up time for a memory sub-system. By initiating the initialization operations for each component in parallel, the overall time to achieve media device availability can be significantly reduced. Additionally, by configuring the front-end component to process non-I/O related requests from the host before the back-end has completed initialization, the delay in responding to some requests can be greatly reduced, thereby providing the ability to meet narrower service level agreements and industry standards for availability. Moreover, by configuring the back-end to queue requests while performing its initialization operations, other components of the firmware data path need not wait for the back-end to be fully available before beginning normal operations. This, in turn, can significantly improve overall memory sub-system performance and availability efficiency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system). In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 can include a firmware management component 113 that can be used to facilitate improved firmware power up sequencing by a firmware components in memory sub-system 110. In some embodiments, the memory sub-system controller 115 includes at least a portion of the firmware management component 113. In some embodiments, the firmware management component 113 is part of the host system 110, an application, or an operating system. In other embodiments, local media controller 135 includes at least a portion of firmware management component 113 and is configured to perform the functionality described herein.

In various implementations, firmware management component 113 can receive a request to perform a set of initialization operations for a front-end component of the firmware, where the front-end component communicates with a security component and a back-end component of the firmware in a data path associated with memory devices 130, 140. Responsive to receiving the request, the firmware management component 113 can initiate the set of initialization operations for the front-end in parallel with initiating a set of initialization operations for the back-end. Responsive to completing the set of initialization operations for the front-end, firmware management component 113 can send a notification to host system 120 to indicate that the front-end is available to respond to requests from the host for configuration information associated with sub-system controller 115 (e.g., non-I/O related requests). Responsive to receiving such a request from host system 120 before the back-end has completed its initialization, firmware management component 113 can provide a response to the request (e.g., provide the requested configuration data).

Additionally, firmware management component 113 can initiate the set of initialization operations for the back-end. As noted, these operations can be performed in parallel with the operations performed by the front-end. Responsive to receiving this request, the firmware management component 113 can facilitate the reservation of file system resources managed by the back-end to prevent allocation of these resources to any subsequently received requests from the front-end or security components to access memory devices 130, 140. Once the resources have been reserved, firmware management component 113 can initiate the initialization operations for the back-end. Should requests be received by the back-end during performance of the initialization operations, since the file system resources have been reserved, the back-end can add the requests to a request queue until the reserved resources are released. Once the back-end completes its initialization, the resources can be released to allow their allocation to any queued requests as well as any newly received requests.

Further details with regards to the operations of the firmware management component 113 are described below with respect to FIGS. 2-4.

Figure 2:
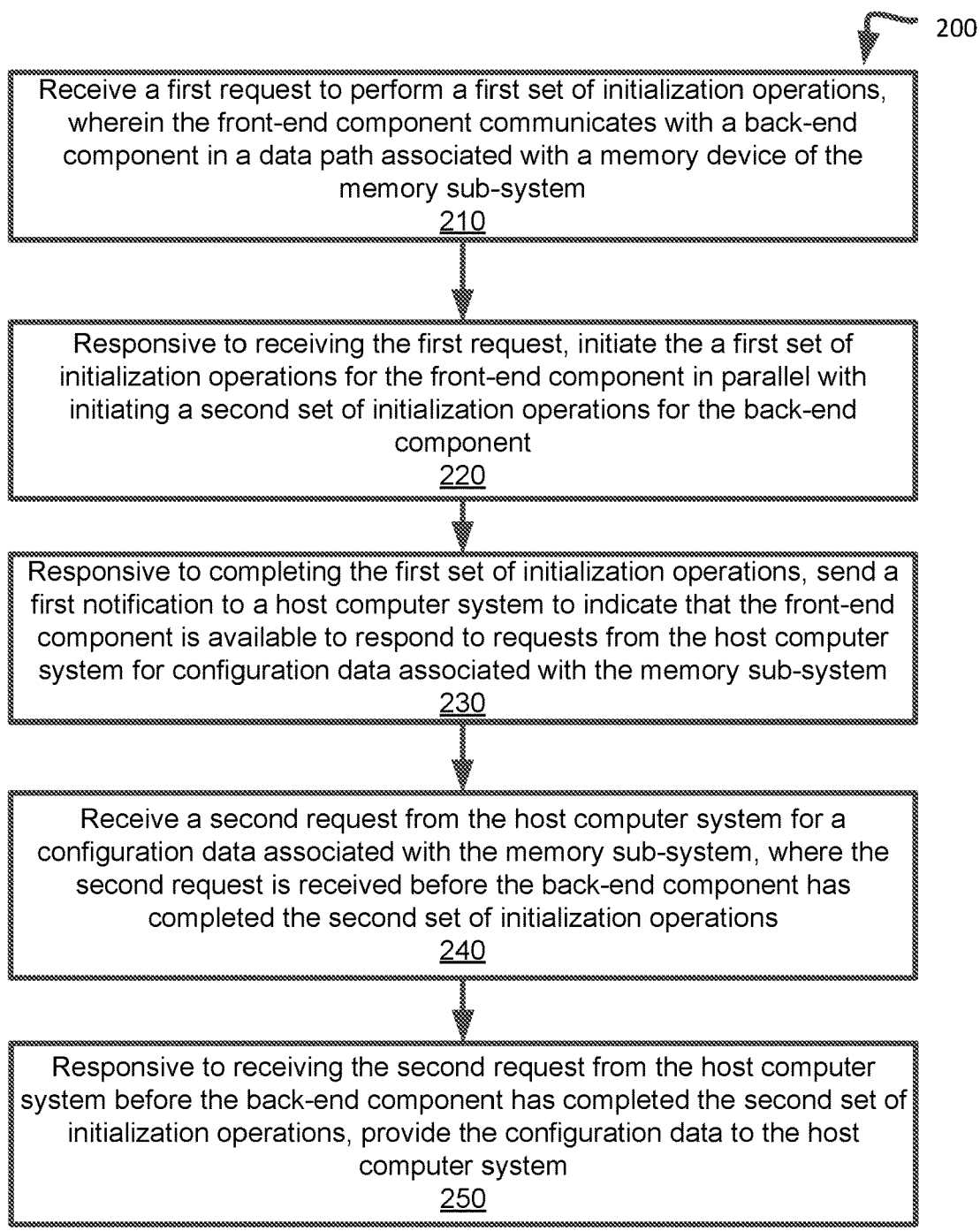
FIG. 2 is a flow diagram of an example method to facilitate improved firmware power up sequencing by a front-end firmware component in memory sub-systems, in accordance with some embodiments of the present disclosure.

FIG. 2 is a flow diagram of an example method 200 to facilitate improved firmware power up sequencing by a front-end firmware component in memory sub-systems, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the firmware management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic can receive, by a front-end component of the memory sub-subsystem firmware, a request to perform a group of initialization operations during a power up sequence for the memory sub-system (e.g., memory sub-system 110 in FIG. 1). In various implementations, the front-end component can be configured to execute in a data path associated with a memory device (or multiple memory devices) of the memory sub-system (e.g., memory devices 130, 140 in FIG. 1), and communicate with other firmware components in the data path. As noted above, the data path can also include a back-end component that manages interactions with the memory devices in the memory sub-system (e.g., I/O operations, file system management, etc.). Additionally, the data path can include a security component that manages authentication of commands received from the front-end and forwarded to a back-end component, encryption/decryption of data, encryption key handshaking with the back-end component, and other similar operations.

In various implementations, the processing logic can receive the request from a scheduling component of the firmware that manages power up sequencing of the various firmware components. In other implementations, the processing logic can receive the request from another component of the memory sub-system controller.

At operation 220, the processing logic can, responsive to receiving the request at operation 210, initiate the group of initialization operations for the front-end component in parallel with initiating a second group of initialization operations for the back-end component. In various implementations, the initialization operations for the front-end can include identifying configuration information associated with the memory sub-system. In some implementations, this information can be loaded into a local memory space to facilitate efficient response to requests received from a host computer system for configuration the configuration information. Additionally, the initialization operations can include identifying connected host computer systems as well as configuring and/or enabling connectivity to these systems in preparation for receiving requests. In some implementations, the initialization operations can additionally include configuring an area of memory to be used to queue received commands until the other firmware components in the data path (e.g., a back-end component, a security component, etc.) have completed initialization and are ready to receive commands/requests. As noted below with respect to FIG. 4, the initialization operations for the back-end can include those operations to enable/configure the file system to be able to respond to requests to perform I/O operations.

At operation 230, the processing logic can, responsive to completing the initialization operations for the front-end, send a notification to the connected host computer system to indicate that the front-end is available to respond to requests from the host for configuration information associated with the memory sub-system. In various implementations a request from the host for configuration information can include an "identify controller" request, which requests information from the memory sub-system that identifies and/or describes the memory sub-system controller device as well as its configuration attributes and/or capabilities. Additionally, the request from the host can include a request to create a memory queue, a request to complete the memory queue, or a request to perform a non-I/O operation (e.g., any other type of request that doesn't involve the file system, doesn't perform an a I/O operation, or that can otherwise be performed by the front-end alone, etc.).

Notably, by enabling the ability to accept and process these types of requests before access to the file system and/or access to the memory device(s) has been enabled, host initialization operations can be initiated within a smaller time window, thereby able to support shorter service level agreement requirements without costly reconfiguration of back-end initialization.

As noted above, the data path can also include a security component of the firmware that manages command/request authorization, encryption/decryption operations, or the like. In such instances, the front-end can forward I/O based requests to the back-end via the security component. For example, the front-end, after receiving a request from the host to perform an I/O operation (a read, a write, etc.), can forward the request to the security component. The security component can validate the request (e.g., confirm the request is received from an authorized requestor, confirm the request is encrypted using a valid encryption key, etc.), and perform encryption/decryption operations prior to forwarding the request to the back-end. Once the request has been validated by the security component, the back-end can receive the request and perform the applicable file system or I/O operation.

In such implementations, at operation 230, processing logic can also send a notification to the security component to cause the security component to perform its own set of initialization operations. As with the notification sent to the host, processing logic can send the notification to the security component responsive to completing the front-end initialization operations. In some instances, processing logic can send this notification to the security component at approximately the same time it sends the notification to the host as described above. Alternatively, it can send the notification to the security module before sending the notification to the host, or after sending the notification to the host. In other implementations, processing logic can send the notification to the security component before completing front-end initialization. In such instances the initialization operations for the front-end, the security component, and the back-end can all be initiated in parallel. In various implementations, the notification sent to the security component can cause the security component to perform initialization operations such as encryption/decryption initialization, encryption handshaking operations with the back-end that confirm encryption/decryption protocols and keys, or other similar operations.

At operation 240, the processing logic can receive a request from a host computer system (e.g., host system 120 in FIG. 1) for configuration information associated with the memory sub-system. These types of requests are described above with respect to operation 230. In various implementations, this request can be received before the back-end component has completed its initialization operations. As noted above, processing logic can process these requests without waiting for the back-end to complete its initialization. In some implementations, since access to the back-end is not needed, processing logic can process these types of requests from the host without checking the status of the back-end initialization first. At operation 250, the processing logic can, responsive to receiving the request from the host before the back-end component has completed its initialization operations, provide the configuration data to the host.

In some implementations, the front-end component can additionally monitor the status of the back-end component in order to determine when I/O commands can be forwarded to the back-end via the security component. In such instances, the processing logic can send a request to the back-end for information associated with the status of its initialization operations. Responsive to receiving a response to the request, the processing logic of the front-end can determine the completion status for the back-end initialization. In other implementations, the back-end can proactively send a broadcast notification to the front-end (and the security component) to indicate that the back-end has completed initialization and can receive requests to perform I/O operations involving the associated memory devices in the memory sub-system.

Responsive to determining that the completion status for the back-end indicates that the back-end initialization operations have not yet completed, processing logic can prevent requests from the host to perform I/O operations from being forwarded to the back-end. In some implementations, processing logic can reject the request entirely. In these instances, processing logic, responsive to receiving a request from the Host to perform an I/O operation associated with a memory device in the memory subsystem, can send a response to the host that indicates that the memory device is not available. Alternatively, processing logic can send a notification to the host to indicate to the host that the memory devices are unavailable, which causes the host to hold any requests to perform I/O operations associated with the memory device.

In other implementations, the front-end can receive I/O requests from the host, but hold them in a request queue until the back-end has completed initialization. In such instances, responsive to determining that the completion status for the back-end indicates that the back-end initialization operations have not yet completed, processing logic can notify the host that the front-end is available to receive requests to perform I/O operations. Responsive to receiving such a request, the processing logic of the front-end component can store the request in a request queue. Once the processing logic of the front-end determines that the back-end is available, the stored requests can be removed from the queue and forwarded to the back-end.

Responsive to determining that the completion status for the back-end indicates that the back-end initialization operations have completed, processing logic can enable the ability for the host to send requests to perform I/O operations. In such instances, the processing logic can send a notification to the host to indicate that the front-end is available to receive and respond to requests to perform I/O operations. Responsive to receiving such a request, the processing logic of the front-end can forward the request to the back-end. As noted above, in some implementations, the received request can be forwarded to the back-end via the security component of the data path. In such instances, the processing logic can send the request to the security component, causing the security component to authenticate the request (e.g., verify the source of the request as authorized to access the memory device(s), decrypt the request from the front-end, encrypt the request for the back-end, etc.), and subsequently, forward the request to the back-end component.

Figure 3:
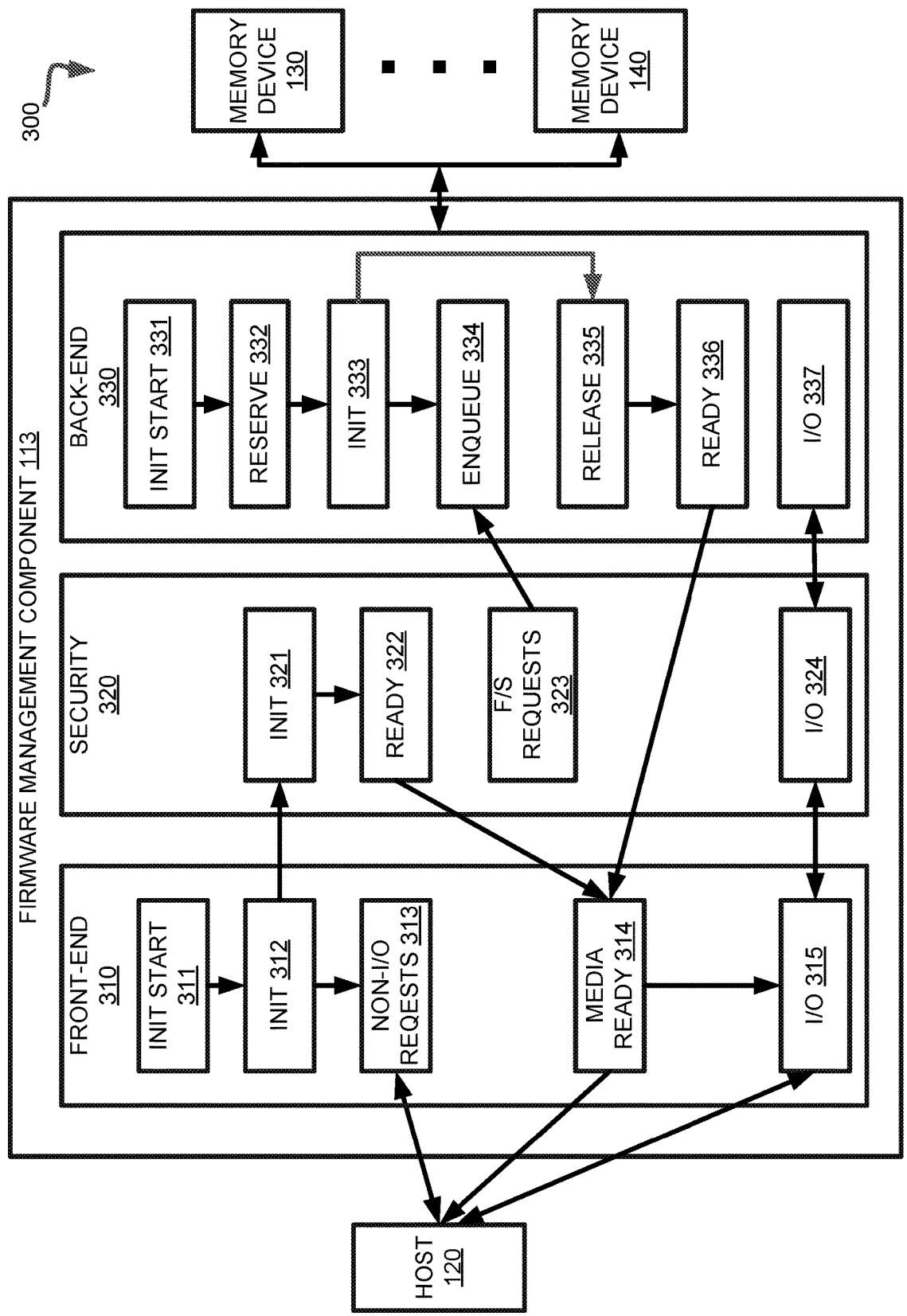
FIG. 3 illustrates a block diagram of a memory sub-system that includes a firmware management component to facilitate improved firmware power up sequencing in memory sub-systems, in accordance with some embodiments of the present disclosure.

FIG. 3 illustrates a block diagram of a memory sub-system 300 that includes a firmware management component 113 (e.g., firmware management component 113 of memory sub-system 110 in FIG. 1) to facilitate improved firmware power up sequencing in a firmware path, in accordance with some embodiments of the present disclosure. It should be noted that for ease of illustration, one start-up sequence is depicted in FIG. 3, in other implementations, aspects of the present disclosure can be applied to different start-up sequences for the firmware components.

As shown in FIG. 3, and as described above with respect to FIG. 2 and below with respect to FIG. 4, firmware management component 113 can manage and synchronize the start-up sequences for front-end component 310, security component 320, and back-end component 330 in the firmware data path. As shown, the front-end 310 can receive a request (or other notification/indication) to perform a set of initialization operations (depicted as init start 311). At approximately the same time, back-end 330 can receive a request to perform its own set of initialization operations (depicted as init start 331).

Responsive to receiving these requests, front-end 310 can initiate its initialization operations (init 312) in parallel with back-end 330 initiating its initialization operations (init 333). Responsive to completing its initialization operations (init 312), front-end 310 can send a notification to host 120 (e.g., host system 120 in FIG. 1) to indicate that front-end 310 can respond to non-I/O requests (non-I/O requests 313). As described above, this allows front-end 310 to service requests from host 120 for configuration information (such as a request to "identify controller") before the back-end has reported that access to memory devices 130, 140 has been enabled for I/O requests.

As shown, responsive to completing its initialization operations (init 312), front-end 310 can also send a notification to security component 320 to initiate its own initialization operations (init 321). Once security component 320 completes its set of initialization operations, it can send a notification to front-end 310 to indicate that it has completed its initialization operations and is ready to receive requests from front-end 310 (ready 322). Additionally, once security component 320 has completed its initialization it can also begin to send file system and/or security requests to back-end 330 (f/s requests 323).

As noted above, and described in further detail below with respect to FIG. 4, back-end 330 can receive the request (init start 331) to perform its own set of initialization operations. Responsive to receiving this request, back-end 330 can reserve file system resources that can be used to perform received I/O and file system requests (reserve 322). This reservation process can be performed to allow requests to be received from front end 310 and/or security component 320 without rejecting them. Rather, by reserving the resources, currently existing request processing infrastructure can be leveraged to queue received requests (enqueuer 334) until the resources are released (release 335).

Once the applicable file system resources have been reserved, back-end 330 can perform its set of initialization operations (init 333). As noted above, any file system requests (f/s requests 323) can be added to the request queue managed by back-end 330 (enqueuer 334). While not specifically depicted in FIG. 3, in some implementations, requests can be received from front-end 310 as well as security component 320. Responsive to completing its initialization operations, back-end 330 can release any reserved file system resources and begin processing requests from the request queue (release 335).

Once the resources have been released, back-end 330 can send a notification to front-end 310 to indicate that the back-end has completed its initialization operations and the memory devices 130, 140 are available to service I/O requests (ready 336). Subsequently, front-end 310 can, responsive to determining that the back-end 330 and security component 320 are both ready to receive requests to perform I/O operations, front-end 310 can send a notification to host 120 to indicate that front-end 310 is available to respond to I/O requests. Upon receiving an I/O request (I/O 315), front-end 310 can forward the request to security component 320, which can perform any applicable security/encryption/decryption/authorization related operations. Security component 320 can then forward the I/O request (I/O 324) to back-end 330 for processing. Back-end 330 can receive the request and perform the necessary I/O operations (e.g., read operations, write operations, delete operations, etc.) associated with the request (I/O 337). Back-end 330 can then return a response, which is forwarded through the firmware data path (security component 320 then front-end 310) to host 120. Further details on the operations performed by back-end 330 are described below with respect to FIG. 4.

Figure 4:
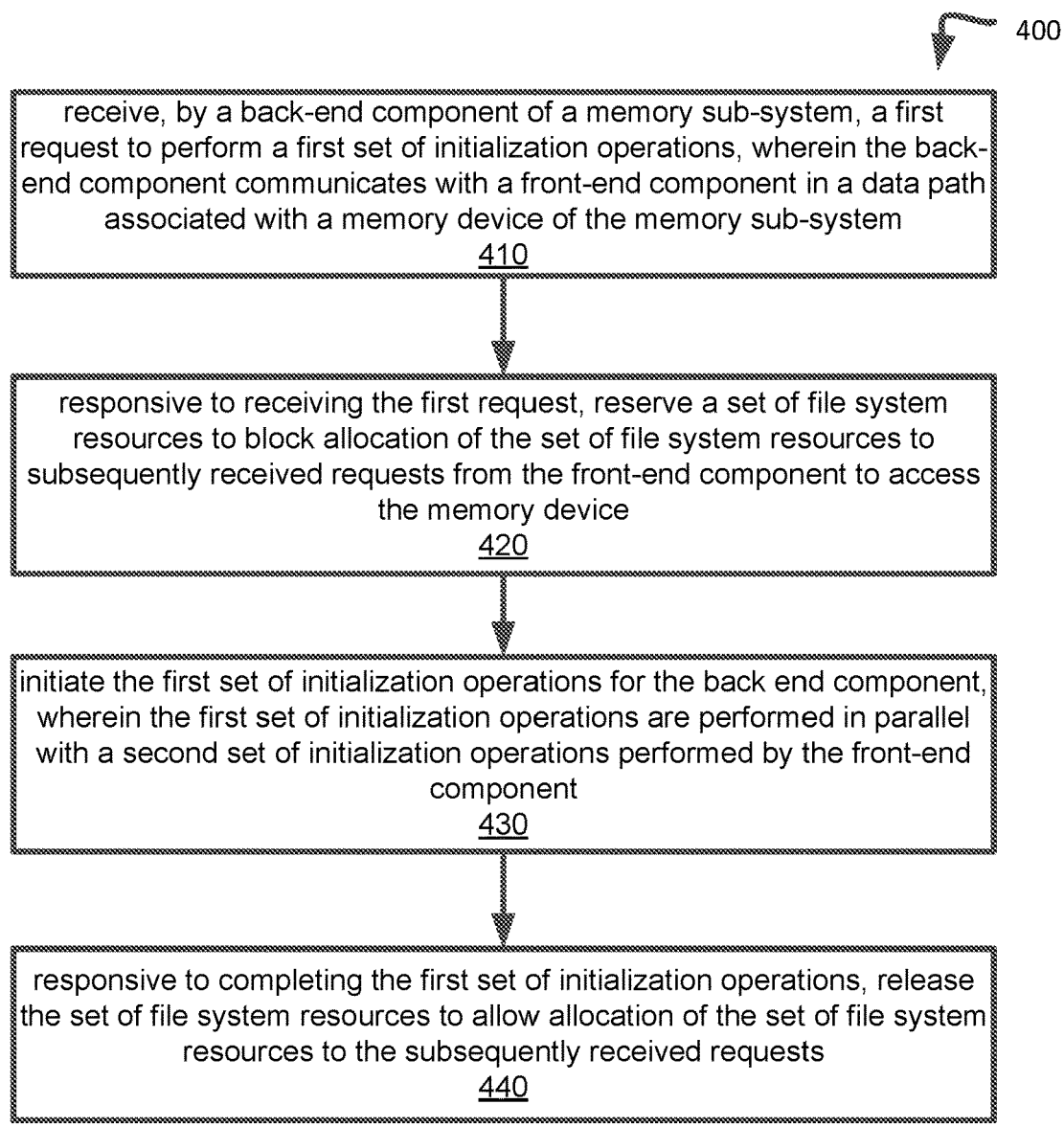
FIG. 4 is a flow diagram of an example method to facilitate improved firmware power up sequencing by a back-end firmware component in memory sub-systems, in accordance with some embodiments of the present disclosure.

FIG. 4 is a flow diagram of an example method 400 to facilitate improved firmware power up sequencing by a back-end firmware component in memory sub-systems, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the firmware management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic can receive, by a back-end component of the memory sub-subsystem firmware, a request to perform a group of initialization operations during a power up sequence for the memory sub-system (e.g., memory sub-system 110 in FIG. 1). As noted above, in some implementations, the back-end component can be configured to execute in a data path associated with a memory device (or multiple memory devices) of the memory sub-system (e.g., memory devices 130, 140 in FIG. 1), and communicate with other firmware components in the data path. Also as noted above, the data path can also include a front-end component that manages interactions with a host computer system and a security component that manages authentication of commands received from the front-end and forwarded to a back-end component, encryption/decryption of data, encryption key handshaking with the back-end component, and other similar operations.

In various implementations, the processing logic can receive the request from a scheduling component of the firmware that manages power up sequencing of the various firmware components. In other implementations, the processing logic can receive the request from another component of the memory sub-system controller. For example, the request can be received from the front-end component so that the processing logic of the back-end can initiate the initialization operations for the back-end in parallel with the initiation of the front-end initialization operations by the front-end.

At operation 420, the processing logic can, responsive to receiving the request at operation 410, reserve a set of file system resources to prevent the performance of I/O or file system operations. By reserving the file system resources, processing logic can block allocation of those resources to any subsequently received requests from the front-end or security components to access the memory device(s) in the memory sub-system. In various implementations, the processing logic can perform the reservation operation by setting flags, tokens, semaphores, etc. to mark the resources as being used, thereby causing received requests to be queued rather than rejected.

In an illustrative example, processing logic can receive a request after the file system resources have been reserved (a request received subsequent to the reservation of the resources). This subsequent request can be received from the front-end or the security component to perform an I/O or file system operation associated with the memory device(s) in the memory sub-system. For example, the security component can send a request for configuration information associated with an encryption protocol used by the back-end, a request to perform an encryption key handshake operation (e.g., operations associated with establishing an agreement between the security component and the back-end on an encryption key/protocol), or the like. Additionally, the front-end or security module can send a request for file system configuration information. Similarly, the request can be to perform an I/O operation. Responsive to receiving the request, the processing logic of the back end can identify the requested files system resources and determine whether those requested resources are available. Since operation 420 should have reserved the file system resources, the processing logic can determine that the requested resources are unavailable, causing the processing logic to hold the request until the resources are released. In such instances, the processing logic can add the subsequent request to a request queue until such time as the requested resources are made available.

At operation 430, the processing logic can initiate the group of initialization operations for the back-end. In some implementations, the processing logic can initiate these operations responsive to completing the file system resource reservation described in operation 420. In various implementations, the processing logic can initiate the back-end initialization operations such that they are performed in parallel with the performance of initialization operations for the front-end as described above with respect to FIG. 2. In various implementations, the initialization operations performed by the back-end can include those operations involved in preparing the memory device(s) to achieve an operational state. These types of operations can include initial power-up of the memory devices, initialization operations, calibration operations, memory rebuild, garbage collection, memory training, or other similar operations. Until these operations are completed, the memory devices may not be fully operational, which can prevent the back-end from servicing requests to perform I/O operations on those memory devices.

At operation 440, the processing logic can, responsive to completing the back-end initialization operations in operation 430, release the set of file system resources that were reserved by operation 420. As noted above, by releasing the reserved resources, the processing logic can allow allocation of those resources to any queued requests as well as any additional subsequently received requests (e.g., requests received after the resources have been enabled but not yet added to the request queue). For example, when a new request is received, processing logic can determine whether the requested resources have been reserved, and if not, allow the request to be processed (or added to the queue if the queue is still being processed). If the request queue is still being processed, responsive to determining that the requested resources have been released (e.g., not reserved, available, etc.), the processing logic can retrieve the queued requests from the request queue, allocate the applicable resources for that request, and perform the file system and/or I/O operations for that request.

In some implementations, responsive to completing the back-end initialization operations, processing logic for the back-end can additionally notify the front-end and/or security components of the memory sub-system that the memory devices are available. In such instances, the processing logic of the back-end can send a notification to the front-end and/or security components of the memory sub-system to indicate that the back-end component is available to respond to requests to perform I/O operations. Alternatively, the back-end can provide its status to front-end or security component responsive to receiving a specific request for such status.

Figure 5:
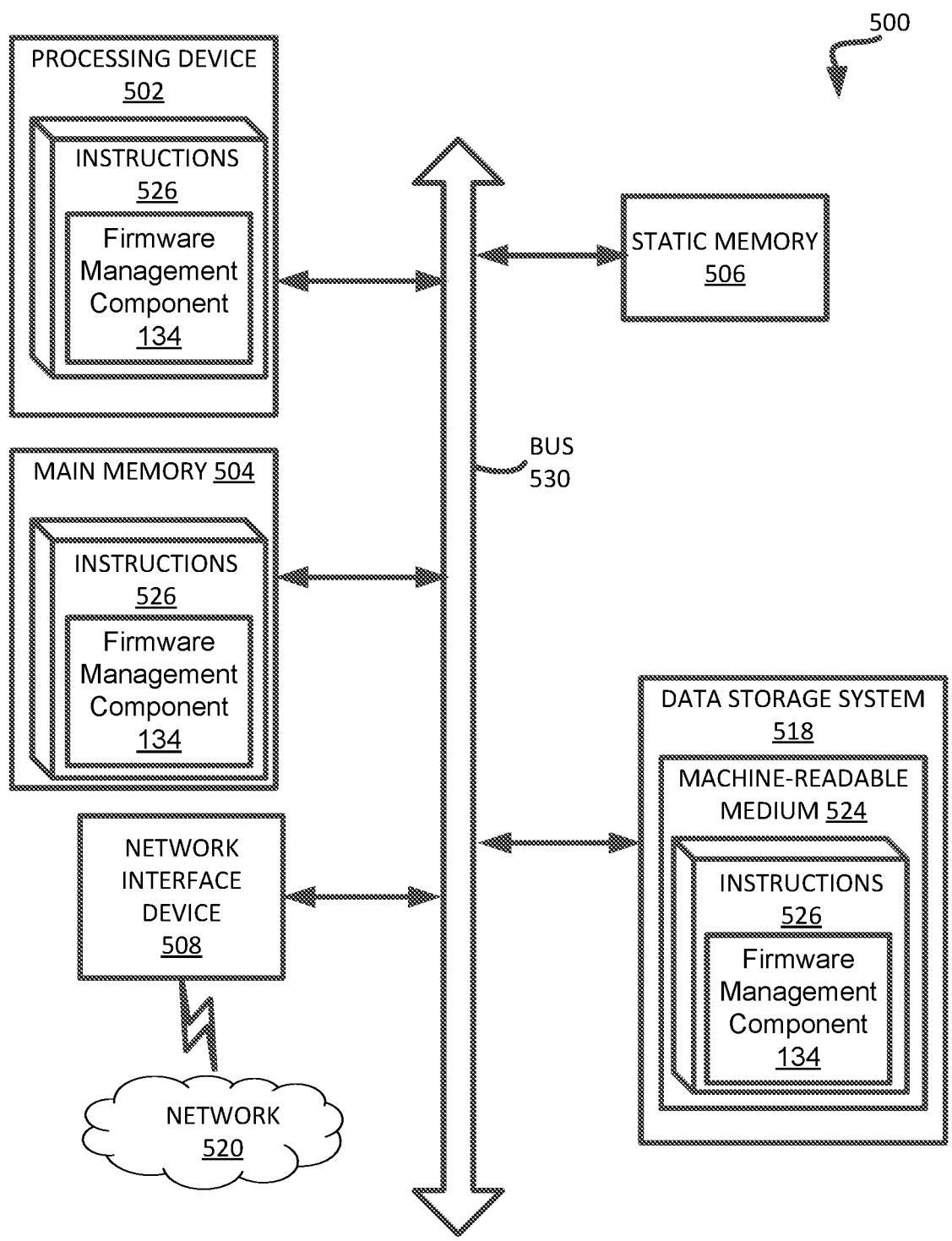
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the firmware management component 134 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 630.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a firmware management component (e.g., the firmware management component 134 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, by a processing device executing a front-end component of a memory sub-system, a first request to perform a first set of initialization operations, wherein the front-end component communicates with a back-end component in a data path associated with a memory device of the memory sub-system;
responsive to receiving the first request, initiating the first set of initialization operations for the front-end component in parallel with initiating a second set of initialization operations for the back-end component; and
responsive to completing the first set of initialization operations and before the back-end component has completed the second set of initialization operations, sending a first notification to a host computer system to indicate that the front-end component is available to respond to requests from the host computer system for configuration data associated with the memory sub-system.

2. The method of claim 1, wherein the front-end component further communicates with a security component in the data path, the method further comprising:
responsive to completing the first set of initialization operations, sending a second notification to the security component to cause the security component to perform a third set of initialization operations for the security component.

3. The method of claim 1, further comprising:
receiving a second request from the host computer system for a configuration data associated with the memory sub-system, wherein the second request comprises at least one of a request to identify the sub-system controller, a request to create a memory queue, a request to complete the memory queue, or a request to perform a non-I/O operation.

4. The method of claim 1, further comprising:
sending a third request to the back-end component for information associated with a status of the second set of initialization operations; and
responsive to receiving a response to the third request, determining an initialization completion status for the back-end component.

5. The method of claim 4, further comprising:
responsive to determining that the completion status for the back-end component indicates that the second set of initialization operations has completed:
    sending a notification to the host computer system to indicate that the front-end component is available to respond to input/output (I/O) requests;
    receiving an I/O request from the host computer system to perform an I/O operation associated with the memory device; and
    forwarding the I/O request to the back-end component.

6. The method of claim 5, further comprising:
responsive to determining that the completion status for the back-end component indicates that the second set of initialization operations has not completed:
    sending a notification to the host computer system to indicate that the front-end component is available to respond to input/output (I/O) requests;
    receiving an I/O request from the host computer system to perform an I/O operation associated with the memory device; and
    storing the I/O request in a request queue.

7. The method of claim 5, further comprising:
responsive to determining that the completion status for the back-end component indicates that the second set of initialization operations has not completed:
    receiving an I/O request from the host to perform an I/O operation associated with the memory device; and
    sending a response to the host computer system indicating that the memory device is not available.

8. A non-transitory computer-readable storage medium storing instructions, which, when executed by a processing device executing a front-end component of a memory sub-system, cause the processing device to perform operations comprising:
receiving a first request to perform a first set of initialization operations, wherein the front-end component communicates with a back-end component in a data path associated with a memory device of the memory sub-system;
responsive to receiving the first request, initiating the first set of initialization operations for the front-end component in parallel with initiating a second set of initialization operations for the back-end component; and
responsive to completing the first set of initialization operations and before the back-end component has completed the second set of initialization operations, sending a first notification to a host computer system to indicate that the front-end component is available to respond to requests from the host computer system for configuration data associated with the memory sub-system.

9. The non-transitory computer-readable storage medium of claim 8, wherein the front-end component further communicates with a security component in the data path, the operations further comprising:
responsive to completing the first set of initialization operations, sending a second notification to the security component to cause the security component to perform a third set of initialization operations for the security component.

10. The non-transitory computer-readable storage medium of claim 8, the operations further comprising:
receiving a second request from the host computer system for a configuration data associated with the memory sub-system, wherein the second request comprises at least one of a request to identify the sub-system controller, a request to create a memory queue, a request to complete the memory queue, or a request to perform a non-I/O operation.

11. The non-transitory computer-readable storage medium of claim 8, the operations further comprising:
sending a third request to the back-end component for information associated with a status of the second set of initialization operations; and
responsive to receiving a response to the third request, determining an initialization completion status for the back-end component.

12. The non-transitory computer-readable storage medium of claim 11, the operations further comprising:
responsive to determining that the completion status for the back-end component indicates that the second set of initialization operations has completed:
    sending a notification to the host computer system to indicate that the front-end component is available to respond to input/output (I/O) requests;
    receiving an I/O request from the host computer system to perform an I/O operation associated with the memory device; and
    forwarding the I/O request to the back-end component.

13. The non-transitory computer-readable storage medium of claim 12, the operations further comprising:
responsive to determining that the completion status for the back-end component indicates that the second set of initialization operations has not completed:
    sending a notification to the host computer system to indicate that the front-end component is available to respond to input/output (I/O) requests;
    receiving an I/O request from the host computer system to perform an I/O operation associated with the memory device; and
    storing the I/O request in a request queue.

14. A system comprising:
a plurality of memory devices; and
a processing device, operatively coupled with the plurality of memory devices to perform operations comprising:
    receiving, by the processing device executing a front-end component of a memory sub-system, a first request to perform a first set of initialization operations, wherein the front-end component communicates with a back-end component in a data path associated with a memory device of the memory sub-system;
    responsive to receiving the first request, initiating the first set of initialization operations for the front-end component in parallel with initiating a second set of initialization operations for the back-end component; and responsive to completing the first set of initialization operations and before the back-end component has completed the second set of initialization operations, sending a first notification to a host computer system to indicate that the front-end component is available to respond to requests from the host computer system for configuration data associated with the memory sub-system.

15. The system of claim 14, wherein the front-end component further communicates with a security component in the data path, and wherein the processing device is to perform further operations comprising:

responsive to completing the first set of initialization operations, sending a second notification to the security component to cause the security component to perform a third set of initialization operations for the security component.

16. The system of claim 14, wherein the processing device is to perform further operations comprising:

receiving a second request from the host computer system for a configuration data associated with the memory sub-system, wherein the second request comprises at least one of a request to identify the sub-system controller, a request to create a memory queue, a request to complete the memory queue, or a request to perform a non-I/O operation.

17. The system of claim 14, wherein the processing device is to perform further operations comprising:

sending a third request to the back-end component for information associated with a status of the second set of initialization operations; and responsive to receiving a response to the third request, determining an initialization completion status for the back-end component.

18. The system of claim 17, wherein the processing device is to perform further operations comprising:

responsive to determining that the completion status for the back-end component indicates that the second set of initialization operations has completed:

sending a notification to the host computer system to indicate that the front-end component is available to respond to input/output (I/O) requests;

receiving an I/O request from the host computer system to perform an I/O operation associated with the memory device; and forwarding the I/O request to the back-end component.

19. The system of claim 18, wherein the processing device is to perform further operations comprising:

responsive to determining that the completion status for the back-end component indicates that the second set of initialization operations has not completed:

sending a notification to the host computer system to indicate that the front-end component is available to respond to input/output (I/O) requests;

receiving an I/O request from the host computer system to perform an I/O operation associated with the memory device; and storing the I/O request in a request queue.

20. The system of claim 18, wherein the processing device is to perform further operations comprising:

responsive to determining that the completion status for the back-end component indicates that the second set of initialization operations has not completed:

receiving an I/O request from the host to perform an I/O operation associated with the memory device; and sending a response to the host computer system indicating that the memory device is not available.

\* \* \* \* \*